Figure 1:
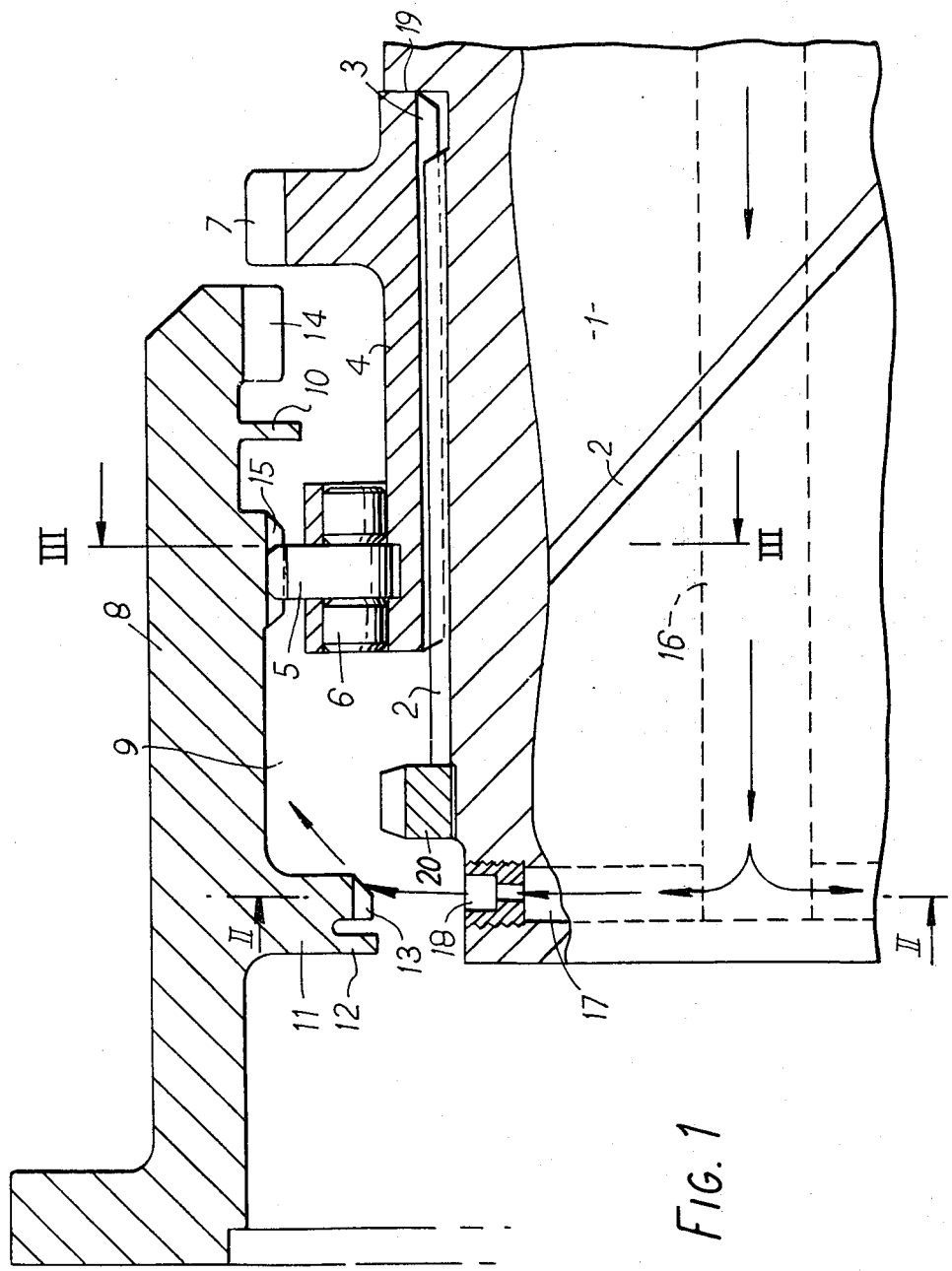

United States Patent [19]

Clements

[11] 3,899,060

[45] Aug. 12, 1975

[54] PAWL AND RATCHET MECHANISM

[75] Inventor: Herbert Arthur Clements, Weybridge, England

[73] Assignee: S.S.S. Patents Limited, London, England

[22] Filed: Feb. 4, 1974

[21] Appl. No.: 439,163

[30] Foreign Application Priority Data
Feb. 5, 1973   United Kingdom................. 5615/73

[52] U.S. Cl. .......................... 192/67 A; 192/113 B
[51] Int. Cl.² ......................................... F16D 23/02
[58] Field of Search....... 192/46, 67 A, 113 B, 53 H

[56] References Cited
UNITED STATES PATENTS

| | | | |
|---|---|---|---|
| 2,907,431 | 10/1959 | Sinclair | 192/67 A |
| 2,971,621 | 2/1961 | Sinclair et al. | 192/67 A |
| 3,197,001 | 7/1965 | Clements | 192/67 A |
| 3,402,794 | 9/1968 | Sinclair et al. | 192/67 A |

*Primary Examiner*—Allan D. Herrmann
*Attorney, Agent, or Firm*—Woodcock, Washburn, Kurtz & Mackiewicz

[57] ABSTRACT

In rotary pawl and ratchet mechanism wherein pawl ratcheting is damped by a ring of liquid in a rotatable chamber in which at least a part of the pawl or each pawl is disposed, the chamber carries a ring of projections having surfaces which impart pre-rotation to liquid entering the chamber.

The invention extends to synchronous self-shifting toothed clutches incorporating pawl and ratchet mechanism for initiating precise interengagement of the coacting clutch teeth upon passage of the clutch input and output parts through synchronism in one direction of relative rotation.

3 Claims, 3 Drawing Figures

PAWL AND RATCHET MECHANISM

This invention relates to rotary pawl and ratchet mechanism comprising at least one ring of ratchet teeth and at least one pawl coacting therewith. The invention relates particularly but not exclusively to pawl and ratchet mechanism incorporated in a synchronous self-shifting toothed clutch for the purpose of initiating precise initial interengagement of the coacting clutch teeth upon passage of the clutch input and output members through synchronism in one direction of relative rotation.

As the speed and duration of the ratcheting action and the size of the pawl and ratchet mechanism increase there is an increasing tendency for the pawl or pawls to chatter and rebound from the ratchet teeth, with consequent increased wear on the pawl or pawls and on the coacting surfaces of the ratchet teeth. British Pat. Specification No. 866,978 describes a synchronous self-shifting toothed clutch incorporating pawl and ratchet mechanism, wherein ratcheting movement of the pawls is damped by liquid fed to a chamber which is constrained for rotation with one of the rotary clutch members and in which at least a part of each pawl is disposed. Liquid entering the chamber is required to rotate with the chamber and to form a ring of liquid which exerts on the pawls a damping action such as to reduce or prevent high speed ratcheting.

It is convenient for the liquid to be fed to the chamber through at least one supply duct which is rotatable with the other of the said rotary clutch members i.e. the part with which the chamber is not constrained for rotation. However, a problem arises when, in the overruning condition of the clutch, the rotary clutch member with which the chamber is constrained for rotation is required to rotate whilst the other rotary clutch member is stationary or in rotation at a lower speed than the said chamber, since following the establishment of a relatively shallow ring of liquid in the rotating chamber further liquid fed into the chamber via the supply duct impinges on the surface of the rotating ring of liquid already formed, and the slight frictional drag at the surface of the ring of liquid is insufficient to set the oncoming liquid in rotation. The result is that much of the oncoming liquid falls into the lower part of the chamber and accumulates therein, and imparts to the rotating ring of liquid that is moving continuously through it a disturbed or wavy motion which tends to set the pawls in movement about their pivot pins, such as to promote violent ratcheting instead of damping the pawl movement. The object of the invention is to overcome or reduce this difficulty.

An embodiment of the invention will now be described by way of example in its application to pawl and ratchet mechanism incorporated in a synchronous self-shifting toothed clutch for the purpose of initiating precise interengagement of the coacting clutch teeth upon passage of the rotary clutch members through synchronism in one direction of relative rotation.

Figure 2:
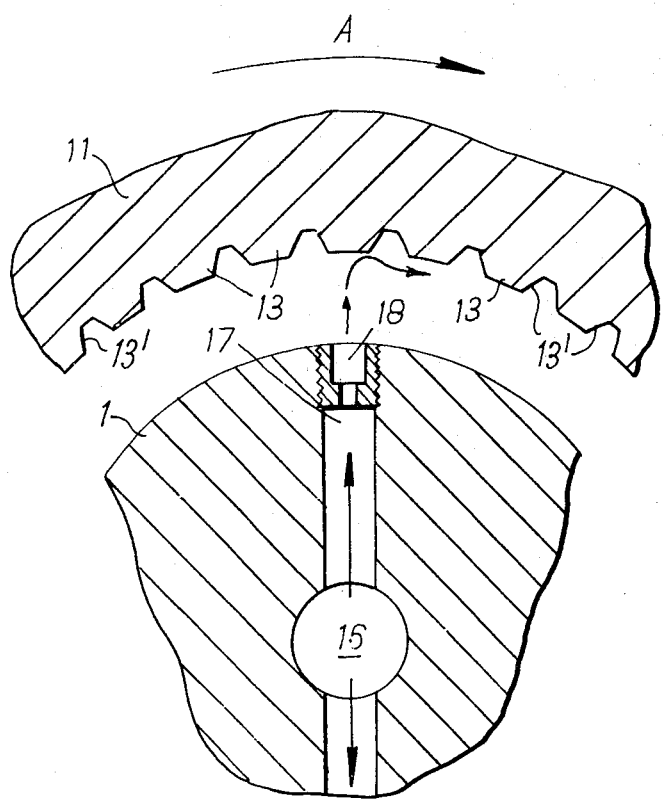
Figure 3:
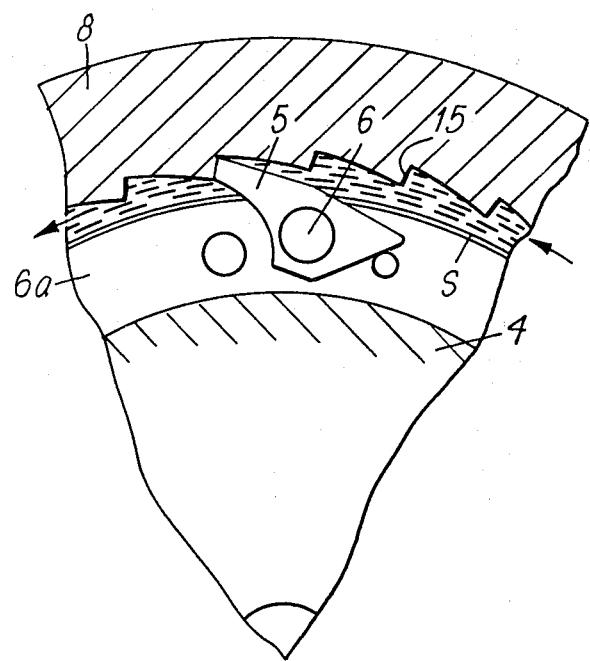

In the accompanying drawing,

FIG. 1 is a half-section on the axis of the clutch,
FIG. 2 is a section on the line II—II of FIG. 1 and
FIG. 3 is a section on the line III—III of FIG. 1.

Referring to the drawing, the clutch includes a shaft 1, which is formed with external right-hand helical splines 2 in which engage internal helical splines 3 in an intermediate member or clutch sleeve 4, which is thereby constrained for helical movement relative to the shaft 1. The clutch sleeve 4 is formed with a flange 6a which carries a ring of pawls, one of which is shown at 5 in FIG. 1, each pawl being mounted on a pawl pin 6 with the nose of the pawl pointing in clockwise direction as viewed from the left-hand end of FIG. 1. The pawls 5 are provided with control springs (not shown) which urge the noses of the pawls radially outwardly. The clutch sleeve 4 carries a ring of external clutch teeth 7.

The clutch also includes a sleeve 8 which is drivably connectable to an output shaft (not shown). The sleeve 8 is formed internally with an annular chamber 9 which is bounded at one end by a radially inwardly projecting annular flange 10, and is bounded at the other end by a radially inwardly projecting annular flange 11 which projects radially inwardly further than does the flange 10. The radially inner periphery of the flange 11 is formed with a lip 12 and with a ring of projections 13 (see FIG. 2). The sleeve 8 carries a ring of internal clutch teeth 14, and is formed with a ring of internal ratchet teeth 15 which are disposed within the chamber 9. The tops of the ratchet teeth 15 are located on a considerably larger radius than the tops of the projections 13, and on a larger radius than the radially inner periphery of the flange 10.

The clutch sleeve 4 carrying the pawls 5 constitutes one element of the pawl and ratchet mechanism, and the sleeve 8 carrying the ratchet teeth 15 constitutes the other element of the pawl and ratchet mechanism. The sleeve 8 also constitutes a first rotary clutch member, and the shaft 1 constitutes a second rotary clutch member.

The shaft 1 is formed with an axial oil feed duct 16 which communicates with radial supply ducts 17 formed in the shaft 1, the orifices of the radial supply ducts 17 being provided with outlet nozzles, one of which is shown at 18, so located that oil emerging from the nozzles 18 impinges on the projections 13 as indicated by the arrows.

FIG. 1 shows the clutch in a disengaged condition, in which the clutch sleeve 4 is against an axial stop 19, the external clutch teeth 7 carried by the clutch sleeve 4 are to the right of the internal clutch teeth 14 carried by the sleeve 8, and the pawls 5 are positioned for ratcheting relative to the ratchet teeth 15. The noses of the pawls 5 are located within the annular chamber 9.

The operation of the clutch is as follows, ignoring for the present the effect of oil feed to the chamber 9 from the nozzles 18. When, as viewed from the left-hand end of the clutch shown in FIG. 1, the sleeve 8 rotates in clockwise direction relative to the shaft 1, as indicated by the arrow A in FIG. 2, the clutch overruns with the ratchet teeth 15 ratcheting relative to the pawls 5. If now the shaft 1 is accelerated in the same direction of rotation as that of the sleeve 8, then when the input shaft 1 tends to overrun the sleeve 8, i.e. the shaft 1 and sleeve 8 pass through rotational synchronism, pawls 5 engage ratchet teeth 15 and the clutch sleeve 4 is shifted helically relative to the shaft 1, to the left in FIG. 1, thereby bringing the external clutch 7 into precise initial interengagement with the internal clutch teeth 14. Thereupon the interaction of the partially interengaged clutch teeth 7 and 14 shifts the clutch sleeve 4 further to the left until the clutch teeth 7 and 14 are fully interengaged, the clutch sleeve 4 then being against an axial stop 20. During the movement of the clutch sleeve 4 to the left relative to the shaft 1 the pawls 5 move axially out of engagement with the ratchet teeth 15.

When the shaft 1 is retarded relative to the sleeve 8 the interaction of the clutch teeth 7 and 14 has the effect of shifting the clutch sleeve 4 to the right relative to the shaft 1, thereby bringing the external clutch teeth 7 out of engagement with the internal clutch teeth 14 and bringing the pawls 5 into ratcheting relationship with the ratchet teeth 15, with the clutch sleeve 4 against the axial stop 19.

Oil is fed to the chamber 9 through the axial duct 16 and the radial supply ducts 17, with the object that when the clutch is in the overrunning condition with the sleeve 8 rotating relative to the shaft 1, which may be stationary or in only slow rotation, there will be established in the chamber 9 a rotating ring of oil which acts on the backs of the pawls 5 in such manner as to maintain them out of ratcheting engagement with the ratchet teeth 15. The rotating ring of oil has a free surface S (FIG. 3) facing towards the axis of rotation of the elements of the pawl and ratchet mechanism, said surface being on a radius determined by the radius of the radially inner periphery of the flange 10. The oil is fed under pressure to the axial duct 16, so that a jet of oil emerges from each of the nozzles 18.

In the absence of the projections 13 rotating with the sleeve 8, although some of the oil fed to the chamber 9 will form into a rotating ring, a considerable proportion of the oil will, as explained above, fail to be set in rotation and will accumulate in the lower part of the chamber 9, with the result that the relatively shallow ring of oil that has formed in the chamber 9 and which passes continuously through the accumulated oil in the lower part of the chamber will be disturbed, with an adverse effect on the damping action that the rotating ring of oil is intended to exert on the pawls 5.

However, the jets of oil emerging from the nozzles 18 impinge on the projections 13, in particular on the flank surfaces 13' thereof, and the effect of these surfaces, which are in rotation with the chamber 9, on the incoming oil is to bring about pre-rotation of the oil prior to its entry into the chamber 9, so that a rotating ring of oil of a depth determined by the flange 10 is established and maintained in the chamber 9 more readily than it would be if the said surfaces were not present.

Whereas in the embodiment described above the ratchet teeth are carried by the sleeve 8 and the pawls are carried by the clutch sleeve 4, the invention includes the converse arrangement in which the ratchet teeth are carried by the clutch sleeve 4 and the pawls are carried by the sleeve 8, with at least a part of each pawl disposed in a liquid-receiving chamber rotatable with the sleeve 8.

The invention also includes pawl and ratchet mechanism, and synchronous self-shifting toothed clutches incorporating such mechanism, wherein one element of the mechanism carries a ring of ratchet teeth and at least one pawl, and the other element of the mechanism carries at least one pawl coacting with the ring of ratchet teeth carried by the said one element and a ring of ratchet teeth with which coacts the pawl carried by the said one element, as exemplified by the clutches described in British Pat. Specification No. 912,020.

I claim:

1. In a rotary pawl and ratchet mechanism comprising first and second rotary elements, means mounting said elements for rotation about a common axis, a ring of ratchet teeth carried by said first rotary element and at least one pawl carried by said second rotary element, one of said elements being formed to provide an annular rotary liquid-receiving chamber in which there can form a pawl-damping rotating ring of liquid having a free surface that faces towards the said axis, and at least one liquid supply duct for supplying damping liquid to said chamber, the improvement comprising means for imparting pre-rotation to liquid supplied to said chamber via said duct, said means including surfaces rotatable with said chamber and located nearer to said axis than said free surface, said duct having an opening located relative to said surfaces such that liquid supplied via said duct impinges on said surfaces prior to entry into said chamber.

2. A synchronous self-shifting toothed clutch comprising first and second rotary clutch members and two sets of coacting interengageable and disengageable clutch teeth, and pawl and ratchet mechanism for initiating interengagement of said sets of coacting clutch teeth upon passage of said rotary clutch members through synchronism in one direction of relative rotation, with the improvement that said pawl and ratchet mechanism is constructed in accordance with claim 1.

3. A synchronous self-shifting toothed clutch assembly comprising first and second rotary clutch members and an intermediate member; at least one pawl carried by one of said intermediate and said first rotary clutch members; a ring of ratchet teeth carried by the other of said intermediate and said first rotary clutch members; said first rotary clutch member being formed to provide an annular rotary liquid receiving chamber in which there can form a pawl-damping rotating ring of liquid having a free surface that faces towards said axis; at least one supply duct having an opening for supplying damping liquid to said chamber; means for imparting prerotation to liquid being supplied to said chamber by said duct including surfaces rotatable with said chamber and located nearer to said axis than said free surface, said opening being located relative to said surfaces such that liquid supplied by said duct impinges on said surfaces prior to entry into said chamber; two sets of coacting clutch teeth, one of said sets being carried by said intermediate member, the other of said sets being carried by said first clutch member; means constraining said intermediate member for movement relative to said second rotary clutch member to bring said one set of clutch teeth into and out of engagement with said other set of clutch teeth according to the direction of relative rotation of said rotary clutch members.

* * * * *